(12) United States Patent
Song

(10) Patent No.: US 8,144,240 B2
(45) Date of Patent: Mar. 27, 2012

(54) DIGITAL PHOTOGRAPHING APPARATUSES, METHODS OF CONTROLLING THE SAME, AND RECORDING MEDIUM STORING COMPUTER READABLE INSTRUCTIONS FOR EXECUTING THE METHODS

(75) Inventor: Won-seok Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 397 days.

(21) Appl. No.: 12/407,846

(22) Filed: Mar. 20, 2009

(65) Prior Publication Data

US 2009/0237553 A1 Sep. 24, 2009

(30) Foreign Application Priority Data

Mar. 21, 2008 (KR) .......................... 10-2008-0026264

(51) Int. Cl.
*G03B 13/00* (2006.01)
(52) U.S. Cl. .......................... 348/356; 396/79
(58) Field of Classification Search ................ 348/356; 396/79
See application file for complete search history.

(56) References Cited

U.S. PATENT DOCUMENTS

| 6,430,368 B1 * | 8/2002 | Hata ............................... 396/79 |
| 2005/0134720 A1 * | 6/2005 | Lee ............................... 348/345 |
| 2006/0072915 A1 * | 4/2006 | Onozawa ....................... 396/121 |
| 2007/0140678 A1 * | 6/2007 | Yost et al. ..................... 396/147 |

FOREIGN PATENT DOCUMENTS

JP 2003-274268 A 9/2003

\* cited by examiner

*Primary Examiner* — Rodney Fuller
*Assistant Examiner* — Fang-Chi Chang
(74) *Attorney, Agent, or Firm* — Drinker Biddle & Reath LLP

(57) ABSTRACT

A digital photographing apparatus capable of automatically determining whether a macro mode is an appropriate mode, a methods of controlling the same, and a computer readable recording medium storing instructions for executing the method(s) is disclosed A lens position determining unit is disclosed that determines whether an auto-focusing lens position is within the lens position range corresponding to a macro mode, according to the position relationship between a lens position point corresponding to a maximum value of the plurality of auto-focus values obtained by an auto-focus value obtaining unit and other lens position points corresponding to other auto-focus lens values.

15 Claims, 7 Drawing Sheets

(CONVENTIONAL ART)

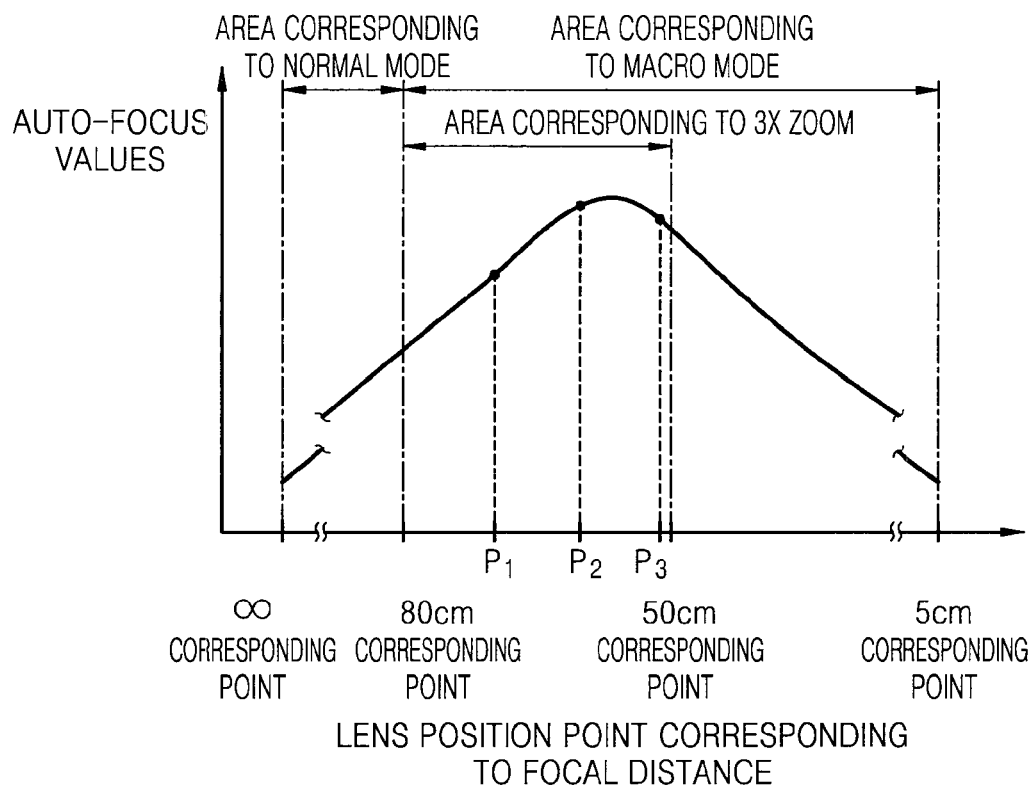
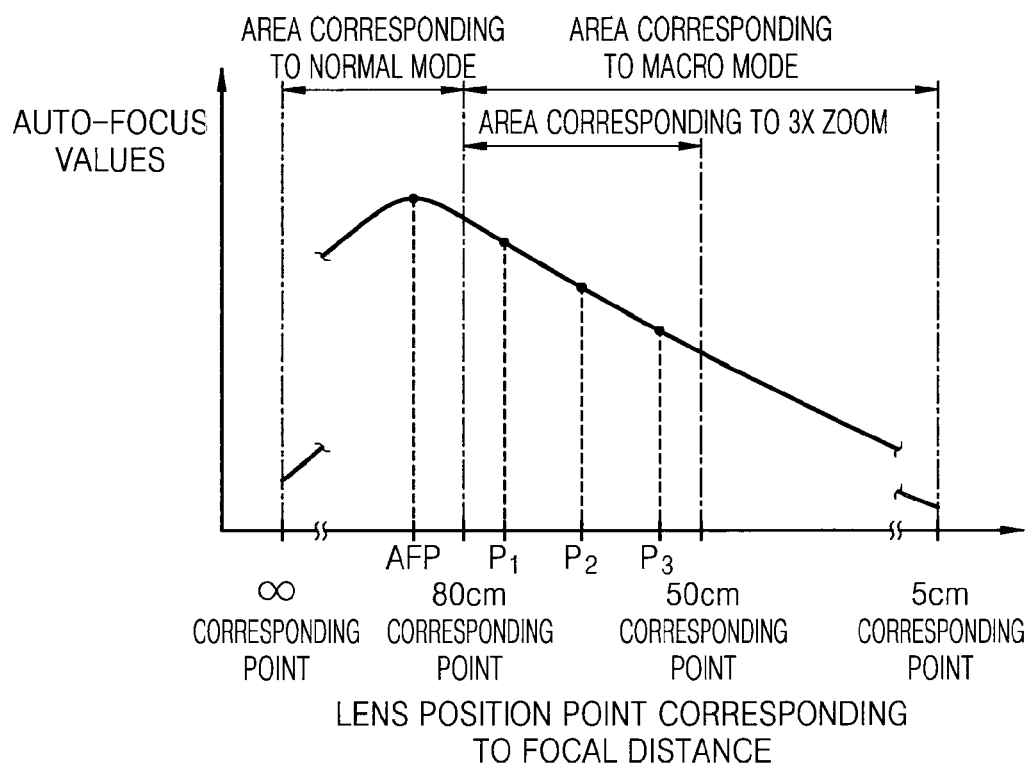

DIGITAL PHOTOGRAPHING APPARATUSES, METHODS OF CONTROLLING THE SAME, AND RECORDING MEDIUM STORING COMPUTER READABLE INSTRUCTIONS FOR EXECUTING THE METHODS

CROSS-REFERENCE TO RELATED PATENT APPLICATION

This application claims the benefit of Korean Patent Application No. 10-2008-0026264, filed on Mar. 21, 2008, in the Korean Intellectual Property Office, the entire contents of which is incorporated herein by reference.

BACKGROUND OF THE INVENTION

1. Field of the Invention

The present invention relates to digital photographing apparatuses, methods of controlling the same, and recording medium storing computer readable instructions for executing the methods. The digital photographing apparatuses and methods capable of determining whether a macro mode is an appropriate mode.

2. Description of the Related Art

Digital photographing apparatuses may store data regarding images captured by a photographing operation in a storage medium and may display images on a display unit by using the data stored in the storage medium.

Digital photographing apparatuses allow users to select various modes to obtain a result satisfying a user's intention. For example, digital photographing apparatuses automatically adjust conditions such as exposure, sensitivity, white balance, etc., based on the selected mode, such as a landscape mode, a character mode, a still-life mode, a night mode and/or a macro mode. The modes may be selected by users so as to obtain an appropriate result in a photograph.

If users do not select a mode for the digital photographing apparatus, the digital photographing apparatuses may automatically determine an appropriate mode for a current photographing situation and then perform photographing in the determined mode. Determining whether a macro mode is appropriate for a current photographing situation may be difficult.

FIG. 1 is a graph illustrating auto-focus values with respect to lens position points for determining an auto-focusing lens position of a conventional digital photographing apparatus. The auto-focus values are calculated from the image. Referring to FIG. 1, the digital photographing apparatus obtains auto-focus values based on the images received at different lens position points. The graph shows that a lens position point corresponding to a peak auto-focus value is determined to be an auto-focusing lens position AFP.

Modes of the digital photographing apparatus may be divided into a macro mode and modes other than the macro mode (hereinafter, referred to as a "normal mode"). Often, the macro mode is selected when a distance between the digital photographing apparatus and a subject is less than approximately 80 cm (i.e., a focal distance is less than 80 cm). Often, the normal mode is selected when the distance between the digital photographing apparatus and the subject is greater than approximately 80 cm (i.e., the focal distance is greater than 80 cm). The focal distance of 80 cm is an example, and the focal distance may be determined according to properties of the photographing apparatus. Often, when the normal mode is selected, the lens position is changed from a point corresponding to an unlimited focal distance to a point corresponding to the focal distance of approximately 80 cm or the focal distance when the macro mode begins. Auto-focus values are calculated during the movement of the lens, and the auto-focusing lens position is determined from the calculated auto-focus values. When the macro mode is selected, the lens position is changed from the point corresponding to the focal distance of 80 cm or the focal distance when the macro mode beings to a point corresponding to 5 cm, or a point corresponding to the end of the macro mode according to properties of the digital photographing apparatus. Auto-focus values are calculated for lens positions, and the auto-focusing lens position is determined from the obtained auto-focus values.

Therefore a digital photographing apparatus needs to determine whether to select a macro mode or a normal mode before performing photographing. Many conventional digital photographing apparatuses calculate the auto-focus value by changing the lens position point from the point corresponding to the unlimited focal distance to the point corresponding to 5 cm in order to determine whether to use the macro mode or the normal mode. Accordingly, many conventional digital photographing apparatuses determine whether to use the normal mode or the macro mode after calculating auto-focus values at all lens position points, which may consume time and power in changing the lens position and in calculating the auto-focus values.

SUMMARY OF THE INVENTION

The present invention provides for digital photographing apparatuses capable of automatically determining whether a macro mode is an appropriate mode, methods of controlling the same, and recording medium storing computer readable instructions for executing the methods.

According to an aspect of the present invention, there is provided a digital photographing apparatus comprising: a lens unit, a position of which is changed to perform auto-focusing; an imaging device obtaining data regarding an image obtained from light input via the lens unit; an auto-focus value obtaining unit obtaining an auto-focus value from the data obtained by the imaging device; and a lens position determining unit for auto-focusing, wherein the auto-focus value obtaining unit obtains a plurality of auto-focus values at a plurality of lens position points within a lens position range corresponding to a macro mode, and the lens position determining unit determines whether an auto-focusing lens position should be within the lens position range corresponding to the macro mode, according to the position relationship between a lens position point corresponding to a maximum value of the plurality of auto-focus values obtained by the auto-focus value obtaining unit and other lens position points corresponding to other auto-focus lens values.

The auto-focus value obtaining unit may obtain the auto-focus values at three lens position points.

The lens position determining unit may determine that the auto-focusing lens position should be within the lens position range corresponding to the macro mode if the lens position point corresponding to the maximum value of the plurality of auto-focus values obtained by the auto-focus value obtaining unit is disposed between the other lens position points corresponding to the other auto-focus lens values.

The lens position determining unit may determine that the auto-focusing lens position is within the lens position range corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a predetermined value.

The digital photographing apparatus may have a lens position range corresponding to a normal mode between an infinite focal distance and a first focal distance and a lens position range corresponding to the macro mode, which is less than the first focal distance, the lens position determining unit, if the lens position point corresponding to the maximum value of the plurality of auto-focus values obtained by the auto-focus value obtaining unit is not disposed between the lens position points corresponding to the other auto-focus values, determines that the auto-focusing lens position should be within a lens position range other than the lens position range corresponding to the macro mode.

The digital photographing apparatus may have a lens position range corresponding to a normal mode between an unlimited focal distance and a first focal distance and the lens position range corresponding to the macro mode, which is less than the first focal distance, and the lens position determining unit, if the lens position point corresponding to the maximum value of the plurality of auto-focus values obtained by the auto-focus value obtaining unit is closer to the lens position point corresponding to the normal mode than the lens position points corresponding to the other auto-focus values, determines that the auto-focusing lens position should be within the lens position range corresponding to the normal mode.

In an embodiment, there is provided a digital photographing apparatus having a zoom function comprising: a lens unit, a position of which is changed to perform auto-focusing; an imaging device obtaining data regarding an image from light input via the lens unit; an auto-focus value obtaining unit obtaining an auto-focus value from the data obtained by the imaging device; and a lens position determining unit for auto-focusing, wherein the auto-focus value obtaining unit obtains a plurality of auto-focus values at a plurality of lens position points within a lens position range corresponding to a selected zoom magnification in a lens position range corresponding to a macro mode, and the lens position determining unit determines whether an auto-focusing lens position should be within the lens position range corresponding to the selected zoom magnification in the lens position area corresponding to the macro mode according to the position relationship between a lens position point corresponding to a maximum value of the plurality of auto-focus values obtained by the auto-focus value obtaining unit and other lens position points corresponding to other auto-focus lens values.

The auto-focus value obtaining unit may obtain the auto-focus values at three lens position points.

The lens position determining unit may determine that the auto-focusing lens position should be within the lens position range corresponding to the selected zoom magnification in the lens position area corresponding to the macro mode if the lens position point corresponding to the maximum value of the plurality of auto-focus values obtained by the auto-focus value obtaining unit is disposed between the other lens position points corresponding to the other auto-focus lens values.

The lens position determining unit may determine that the auto-focusing lens position should be within the lens position range corresponding to the selected zoom magnification in the lens position area corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a predetermined value.

The digital photographing apparatus may have a lens position range corresponding to a normal mode between an unlimited focal distance and a first focal distance and a lens position range corresponding to the macro mode, which is less than the first focal distance, and the lens position determining unit, if the lens position point corresponding to the maximum value of the plurality of auto-focus values obtained by the auto-focus value obtaining unit is not disposed between the lens position points corresponding to the other auto-focus values, determines that the auto-focusing lens position should be determined in a lens position range other than the lens position area corresponding to the selected zoom magnification in the lens position range corresponding to the macro mode or a lens position range corresponding to the normal mode.

The digital photographing apparatus may have the lens position range corresponding to a normal mode between an infinite focal distance and a first focal distance and the lens position range corresponding to the macro mode, which is less than the first focal distance, and the lens position determining unit, if the lens position point corresponding to the maximum value of the plurality of auto-focus values obtained by the auto-focus value obtaining unit is closer to the lens position point corresponding to the normal mode than the lens position points corresponding to the other auto-focus values, determines that the auto-focusing lens position should be within the lens position range corresponding to the normal mode.

The digital photographing apparatus may have a lens position range corresponding to a normal mode between an infinite focal distance and a first focal distance and the lens position range corresponding to the macro mode, which is less than the first focal distance, and the lens position determining unit, if the lens position point corresponding to the maximum value of the plurality of auto-focus values obtained by the auto-focus value obtaining unit is the farthest from the lens position point corresponding to the normal mode compared to the lens position points corresponding to the other auto-focus values, and the selected zoom magnification is not a minimum zoom magnification, determines that the auto-focusing lens position should be within the lens position area corresponding to the normal mode, and the selected zoom magnification should be reduced.

According to another aspect of the present invention, there is provided a method of controlling a digital photographing apparatus, the method comprising: obtaining a plurality of auto-focus values at a plurality of lens position points within a lens position range corresponding to a macro mode; and determining whether an auto-focusing lens position should be within the lens position range corresponding to the macro mode, according to the position relationship between a lens position point corresponding to a maximum value of the plurality of auto-focus values and other lens position points corresponding to other auto-focus lens values.

The determining may comprise: determining that the auto-focusing lens position should be within the lens position range corresponding to the macro mode if the lens position point corresponding to the maximum value of the plurality of auto-focus values is disposed between the other lens position points corresponding to the other auto-focus lens values.

In an embodiment, the obtaining may comprise: obtaining the auto-focus values at three lens position points.

The determining may comprise: determining that the auto-focusing lens position is within the lens position area corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a first predetermined value or a ratio of the maximum auto-focus value to the minimum auto-focus value is greater than a second predetermined value.

The digital photographing apparatus may have a lens position range corresponding to a normal mode between an infinite focal distance and a first focal distance and a lens position range corresponding to the macro mode, which is less than the first focal distance, the determining may comprise: if the lens position point corresponding to the maximum value of the plurality of auto-focus values obtained by the auto-focus value obtaining unit is not disposed between the lens position points corresponding to the other auto-focus values, determining that the auto-focusing lens position should be within a lens position range other than the lens position area corresponding to the macro mode.

The digital photographing apparatus may have a lens position range corresponding to a normal mode between an unlimited focal distance and a first focal distance and the lens position range corresponding to the macro mode, which is less than the first focal distance, and the determining may comprises: if the lens position point corresponding to the maximum value of the plurality of auto-focus values obtained by the auto-focus value obtaining unit is closer to the lens position point corresponding to the normal mode than the lens position points corresponding to the other auto-focus values, determining that the auto-focusing lens position should be within the lens position range corresponding to the normal mode.

According to another aspect of the present invention, there is provided a method of controlling a digital photographing apparatus, the method comprising: obtaining a plurality of auto-focus values at a plurality of lens position points within a lens position range corresponding to a selected zoom magnification in a lens position range corresponding to a macro mode; and determining whether an auto-focusing lens position should be within the lens position range corresponding to the selected zoom magnification in the lens position range corresponding to the macro mode, according to the position relationship between a lens position point corresponding to a maximum value of the plurality of auto-focus values and other lens position points corresponding to other auto-focus lens values.

The determining may comprise: determining that the auto-focusing lens position should be within the lens position range corresponding to the selected zoom magnification in the lens position range corresponding to the macro mode if the lens position point corresponding to the maximum value of the plurality of auto-focus values is disposed between the other lens position points corresponding to the other auto-focus lens values.

In an embodiment, the obtaining may comprise: obtaining the auto-focus values at three lens position points.

The determining may comprise: determining that the auto-focusing lens position should be within the lens position range corresponding to the selected zoom magnification in the lens position range corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a predetermined value.

The digital photographing apparatus may have a lens position range corresponding to a normal mode between an unlimited focal distance and a first focal distance and a lens position range corresponding to the macro mode, which is less than the first focal distance, and the determining may comprise, if the lens position point corresponding to the maximum value of the plurality of auto-focus values obtained by the auto-focus value obtaining unit is not disposed between the lens position points corresponding to the other auto-focus values, determining that the auto-focusing lens position should be determined in a lens position area other than the lens position range corresponding to the selected zoom magnification in the lens position range corresponding to the macro mode or a lens position range corresponding to the normal mode.

The digital photographing apparatus may have the lens position range corresponding to a normal mode between an infinite focal distance and a first focal distance and the lens position range corresponding to the macro mode, which is less than the first focal distance, and the determining may comprise, if the lens position point corresponding to the maximum value of the plurality of auto-focus values obtained by the auto-focus value obtaining unit is closer to the lens position point corresponding to the normal mode than the lens position points corresponding to the other auto-focus values, determining that the auto-focusing lens position should be within the lens position range corresponding to the normal mode.

The digital photographing apparatus may have a lens position range corresponding to a normal mode between an infinite focal distance and a first focal distance and the lens position range corresponding to the macro mode, which is less than the first focal distance, and the determining may comprise, if the lens position point corresponding to the maximum value of the plurality of auto-focus values obtained by the auto-focus value obtaining unit is the farthest from the lens position point corresponding to the normal mode compared to the lens position points corresponding to the other auto-focus values, and the selected zoom magnification is not a minimum zoom magnification, determining that the auto-focusing lens position should be within the lens position area corresponding to the normal mode, and the selected zoom magnification should be reduced.

In an embodiment, there is provided a computer readable recording medium storing instructions for executing the method(s).

BRIEF DESCRIPTION OF THE DRAWINGS

The above and other features and advantages of the present invention will become more apparent by describing in detail exemplary embodiments thereof with reference to the attached drawings in which:

FIG. 9A is an example of a graph showing a part of the graph shown in FIG. 8;

FIG. 9B is an example of a graph showing auto-focus values, which are used by a digital photographing apparatus to determine whether an auto-focusing lens position within a lens position range corresponding to a selected zoom magnification in a lens position range corresponding to a macro mode according to an embodiment of the present invention;

DETAILED DESCRIPTION OF THE INVENTION

Hereinafter, the present invention will be described in detail by explaining embodiments of the invention with reference to the attached drawings.

Figure 1:
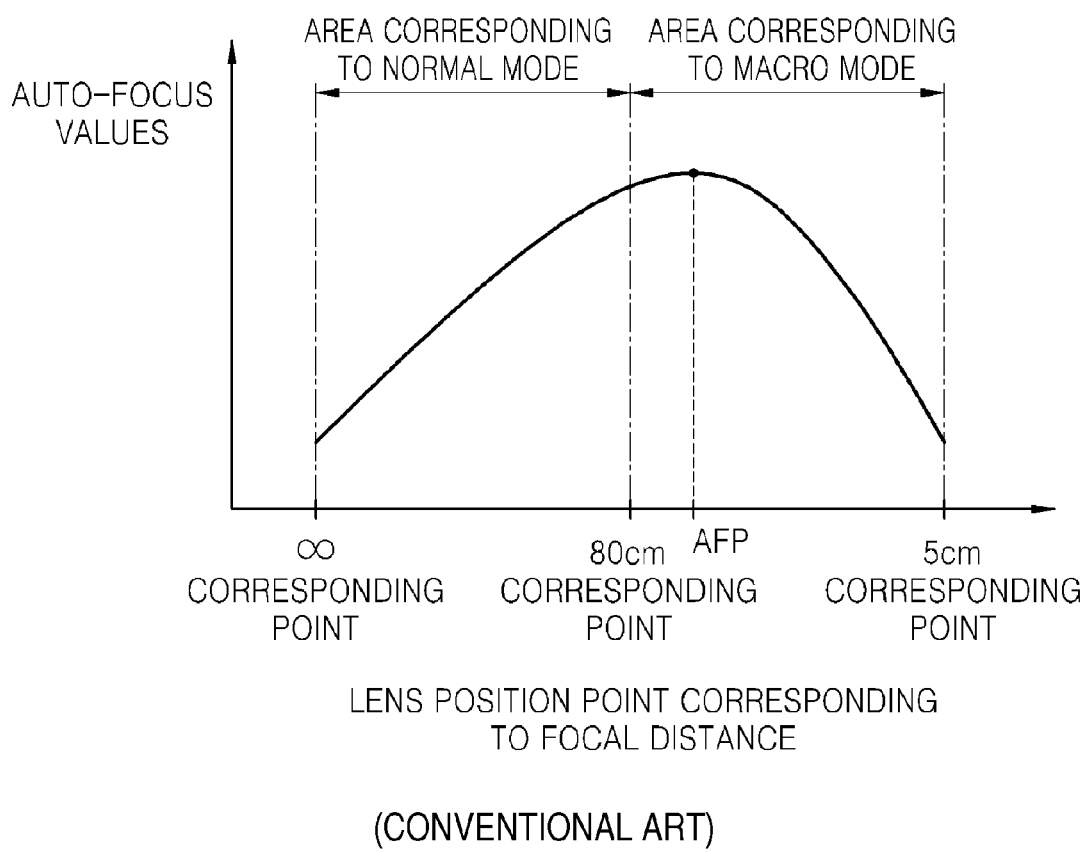
FIG. 1 is a graph illustrating an example of auto-focus values with respect to all lens position points to determine an auto-focusing lens position of a conventional digital photographing apparatus.
Figure 2:
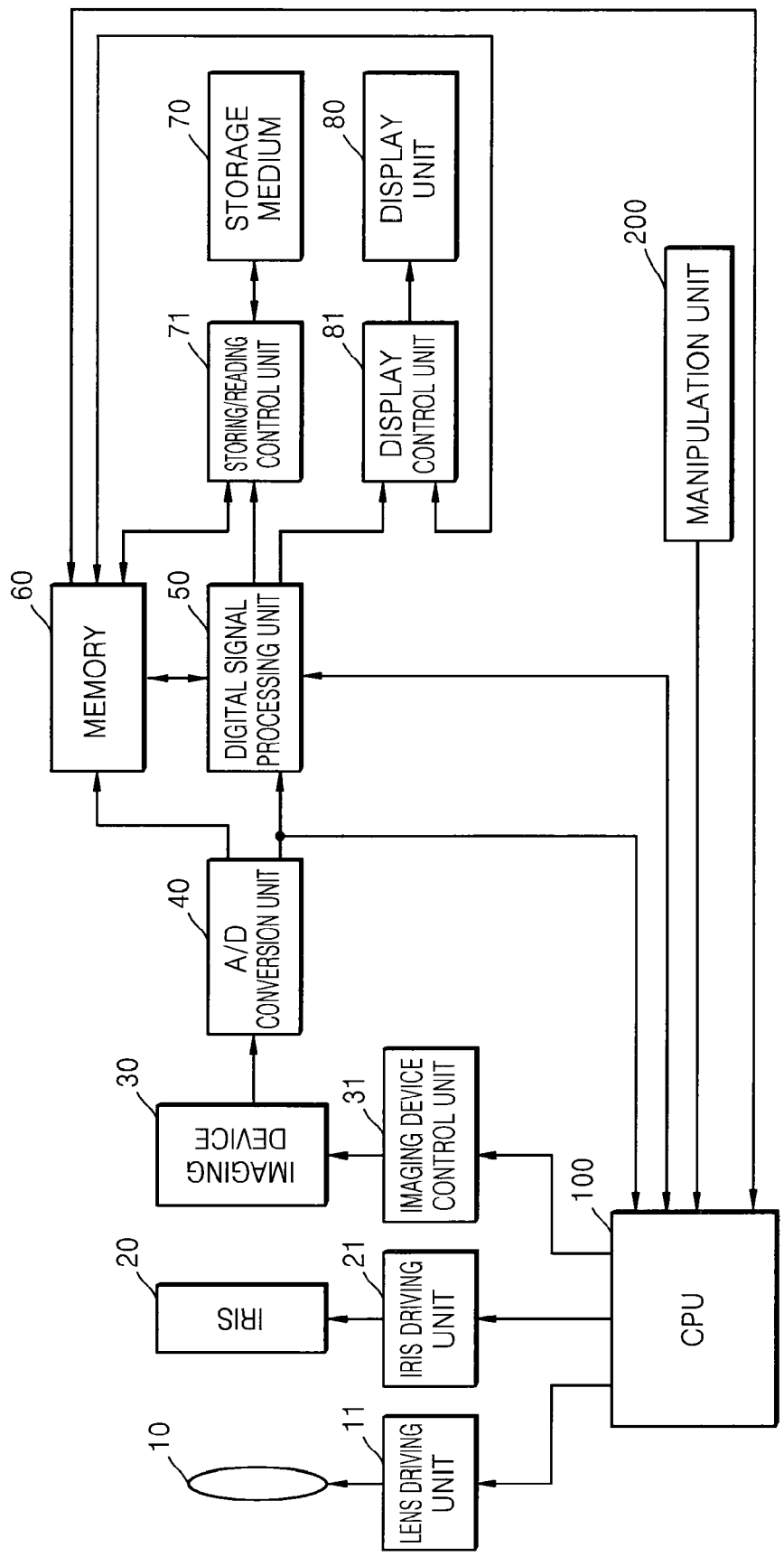
FIG. 2 is an example of a schematic block diagram of a digital photographing apparatus according to an embodiment of the present invention.

FIG. 2 is an example of a schematic block diagram of a digital photographing apparatus according to an embodiment of the present invention. Referring to FIG. 2, in an embodiment, the general operation of the digital photographing apparatus is managed by a central processing unit (CPU) 100 and the digital photographing apparatus includes a manipulation unit 200 which may include keys for generating electric signals based on a user's input. The electric signals generated by the manipulation unit 200 are transmitted to the CPU 100 so that the CPU 100 may control the digital photographing apparatus in accordance with the electric signals.

In a photographing mode, when an electric signal based on a user's input is applied to the CPU 100, the CPU 100 controls a lens driving unit 11, an iris driving unit 21, and an imaging device control unit 31 so as to respectively adjust a position of a lens unit 10, an opening degree of an iris 20, and the sensitivity of an imaging device 30, in accordance with the user's input. The position of the lens unit 10 may be changed to perform auto-focusing. The lens unit 10 may include a plurality of lenses in which positions of some lenses may be changed to perform auto-focusing. Thus, various modifications of the lens unit 10 may be possible. The imaging device 30 generates data regarding an image obtained from light input via the lens unit 10. The data regarding the image includes data regarding a final image generated when an auto-focusing lens position is determined and data regarding an intermediate image used to obtain an auto-focus lens position value. In an embodiment, an analog/digital (A/D) conversion unit 40 converts analog data output from the imaging device 30 into digital data. The A/D conversion unit 40 may not be included in accordance with characteristics of the imaging device 30, e.g. if the imaging device is a digital device.

In an embodiment, the data generated by the imaging device 30 may be input to a digital signal processing unit 50 through a memory 60 or may be directly input to the digital signal processing unit 50. The data may be input to the CPU 100. Examples of the memory 60 include read-only memory (ROM) and random access memory (RAM). In embodiments, the digital signal processing unit 50 may perform digital signal processing such as gamma correction and white balance adjustment. As will be described later, the digital signal processing unit 50 may further comprise an auto-focus value obtaining unit (not shown) and/or a lens position determining unit (not shown). The auto-focus value obtaining unit and/or the lens position determining unit may not be included in the digital signal processing unit 50 and thus various modifications thereof may be possible. In an embodiments, the auto-focus value obtaining unit and/or the lens position determining unit may suffice for the digital signal processing unit 50. The operation of the auto-focus value obtaining unit and/or the lens position determining unit will be described later.

The data output from the digital signal processing unit 50 may be transmitted to a display control unit 81 through the memory 60 or may be directly transmitted to the display control unit 81. In an embodiment, the display control unit 81 controls a display unit 80 so as to display an image on the display unit 80. The data output from the digital signal processing unit 50 is input to a storing/reading control unit 71 through the memory 60 or may be directly input. In an embodiment, the storing/reading control unit 71 stores the data in a storage medium 70 in accordance with a signal based on a user's input or may automatically store the data. The storing/reading control unit 71 may read data regarding an image, from an image file stored in the storage medium 70, and input the data to the display control unit 81 through the memory 60 or by another path so as to display the image on the display unit 80. The storage medium 70 may be detachable from the digital photographing apparatus or may be permanently fixed to the digital photographing apparatus.

In an embodiment, the auto-focus value obtaining unit obtains the auto-focus value from the data obtained by the imaging device 30. In an embodiment, the auto-focus value obtaining unit obtains the auto-focus value at each lens position point by changing the position point of the lens unit 10 and calculating the auto-focus value for each of the lens position points. In an embodiment, the lens position determining unit determines the auto-focusing lens position.

Figure 3:
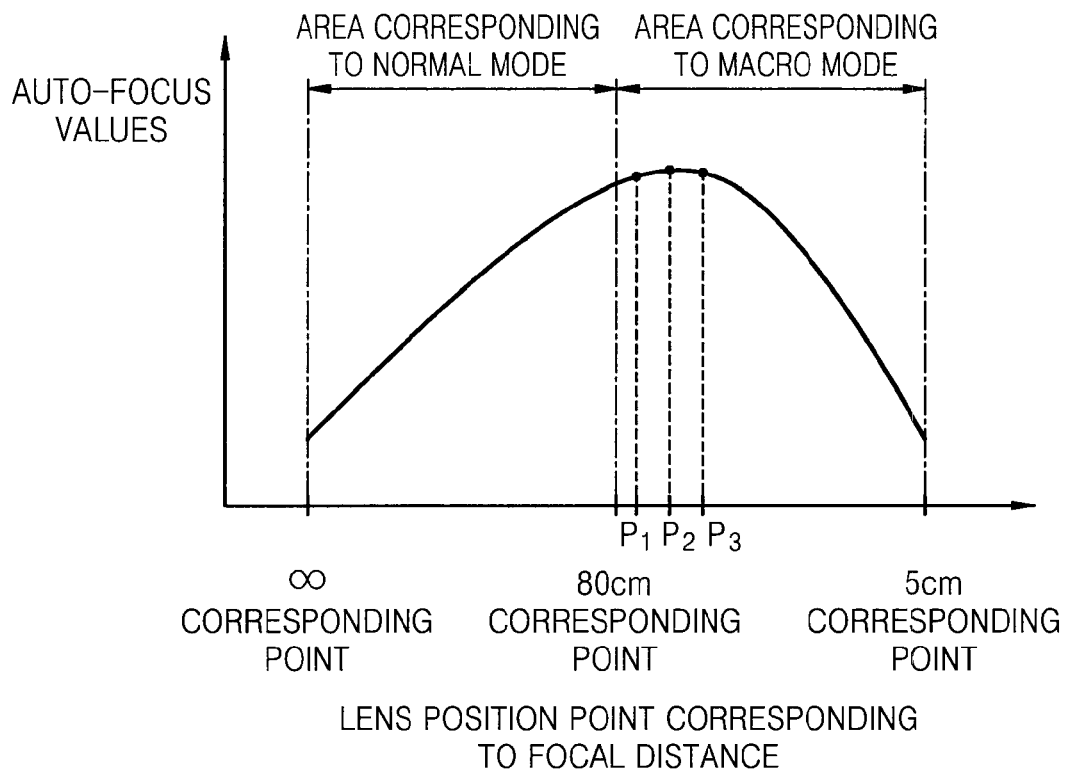
FIG. 3 is an example of a graph showing auto-focus values, which are used by a digital photographing apparatus to determine whether an auto-focusing lens position is within a lens position range corresponding to a macro mode according to an embodiment of the present invention.
Figure 4:
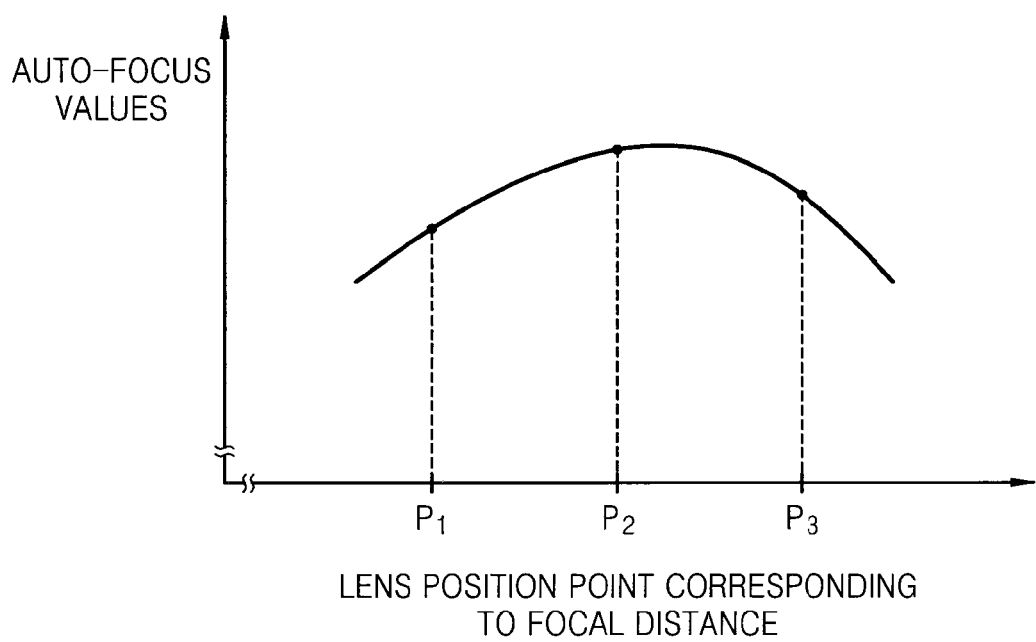
FIG. 4 is an example of a graph showing a part of the graph shown in FIG. 3.

FIG. 3 is an example of a graph showing auto-focus values, which may be used by a digital photographing apparatus to determine whether an auto-focusing lens position should be within a lens position range corresponding to a macro mode according to an embodiment of the present invention. FIG. 4 is an example of a graph showing a part of the graph shown in FIG. 3. In an embodiment, the digital photographing apparatus does not obtain an auto-focus value at lens position points throughout the range as shown in FIG. 3.

Embodiments of the digital photographing apparatus of the present embodiment first determine whether the macro mode or a normal mode (referring to all modes other than the macro mode) is appropriate for a current photographing status. To determine whether the macro mode or a normal mode is appropriate, an auto-focus value obtaining unit obtains auto-focus values at a plurality of lens position points within the lens position area corresponding to the macro mode. The plurality of lens position points may not be all the lens position points from which auto-focus values are obtained.

In an embodiment, a lens position determining unit determines whether the auto-focusing lens position should be within the macro mode lens position range corresponding to the macro mode according to the position relationship between a lens position point corresponding to a maximum value of the auto-focus values obtained by the auto-focus value obtaining unit and other lens position points corresponding to other auto-focus lens values.

In an embodiment, if the lens position determining unit determines that the auto-focusing lens position should be within the lens position range corresponding to the macro mode, then the auto-focus value obtaining unit obtains the auto-focus value at each lens position point (i.e., in an embodiment, each lens position point within a range between a point corresponding to 80 cm and a point corresponding to 5 cm) within the lens position range corresponding to the macro mode, and then determines the auto-focusing lens position using the obtained auto-focus values. If the lens position determining unit determines that the auto-focusing lens position should be determined in an range beyond the lens position range corresponding to the macro mode, the auto-focus value obtaining unit obtains the auto-focus value at each lens position point (i.e., in an embodiment, each lens position point within an infinite range and the range between a point corresponding to 80 cm) within the lens position range corresponding to the normal mode, and then determines the auto-focusing lens position using the obtained auto-focus values. Although the lens position range corresponding to the macro mode is between the lens position point corresponding to 80 cm and the lens position point corresponding to 5 cm in the present embodiment, a range of a focal distance where the macro mode operates may be different according to characteristics of the digital photographing apparatus.

Since the auto-focus value obtaining unit obtains the auto-focus values at the plurality of lens position points within the lens position range corresponding to the macro mode so as to determine whether the macro mode or the normal mode (refer to modes other than the macro mode) is appropriate to the current photographing status, the auto-focus value obtaining unit may obtain auto-focus values at three lens position points, $P_1$, $P_2$, and $P_3$, shown in FIGS. 3 and 4. It is possible to determine whether the auto-focusing lens position is included in the lens position range corresponding to the macro mode by obtaining the auto-focus values at the three lens position points, $P_1$, $P_2$, and $P_3$. This may have the advantage of reducing the power and time required to change the lens position points compared with apparatuses that use more than three lens position points. Hereinafter, the digital photographing apparatus of the present embodiment obtains the auto-focus values at the three lens position points, $P_1$, $P_2$, and $P_3$, for convenience of description. In this case, the three lens position points, $P_1$, $P_2$, and $P_3$, may be disposed at equal intervals in order to precisely obtain the auto-focus values.

In an embodiment, when the lens position point $P_2$ corresponding to a maximum value of the auto-focus values obtained by the auto-focus value obtaining unit is disposed between the lens position points $P_1$ and $P_3$ corresponding to other auto-focus values, the lens position determining unit determines that the auto-focusing lens position should be within the lens position area corresponding to the macro mode. Therefore, the digital photographing apparatus will then obtain the auto-focus value within the position range corresponding to the macro mode rather than the position range corresponding to the normal mode, thereby quickly and determining the auto-focusing lens position and reducing power consumption accordingly.

Figure 5:
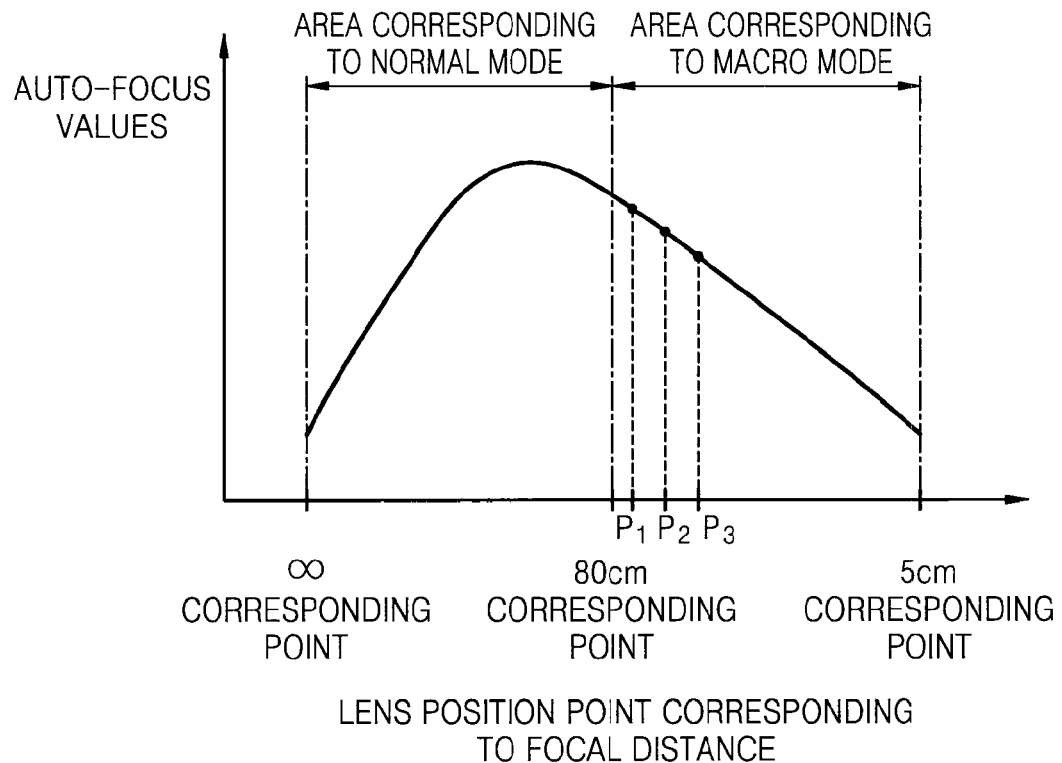
FIG. 5 is an example of a graph showing auto-focus values, which are used by a digital photographing apparatus to determine whether an auto-focusing lens position is within a lens position range corresponding to a macro mode according to another embodiment of the present invention.

FIG. 5 is an example of a graph showing auto-focus values, which is used by a digital photographing apparatus to determine whether an auto-focusing lens position should be within a lens position range corresponding to a macro mode according to another embodiment of the present invention.

Referring to FIG. 5, in an embodiment, the digital photographing apparatus of the present embodiment has a lens position range corresponding to a normal mode between an infinite focal distance and a first focal distance (e.g., 80 cm) and the lens position range corresponding to the macro mode, which is less than the first focal distance. In an embodiment, if a lens position point $P_1$ corresponding to a maximum value of the auto-focus values obtained by an auto-focus value obtaining unit is not disposed between lens position points $P_2$ and $P_3$ corresponding to other auto-focus values, a lens position determining unit determines that the auto-focusing lens position should be in a range beyond the lens position range corresponding to the macro mode. In an embodiment, if the lens position point $P_1$ corresponding to the maximum value of the auto-focus values obtained by the auto-focus value obtaining unit is closer to the lens position point corresponding to the normal mode than the lens position points $P_2$ and $P_3$ corresponding to other auto-focus values, the lens position determining unit determines that the auto-focusing lens position should be within the lens position range corresponding to the normal mode. In an embodiment, since the digital photographing apparatus determined that the auto-focus value is within the range corresponding to the normal mode, the digital photographing apparatus changes the lens position points within the range corresponding to the normal mode, and not within the range corresponding to the macro mode, to determine the auto-focus value. This may save time and power in determining the auto-focusing lens position.

Figure 6:
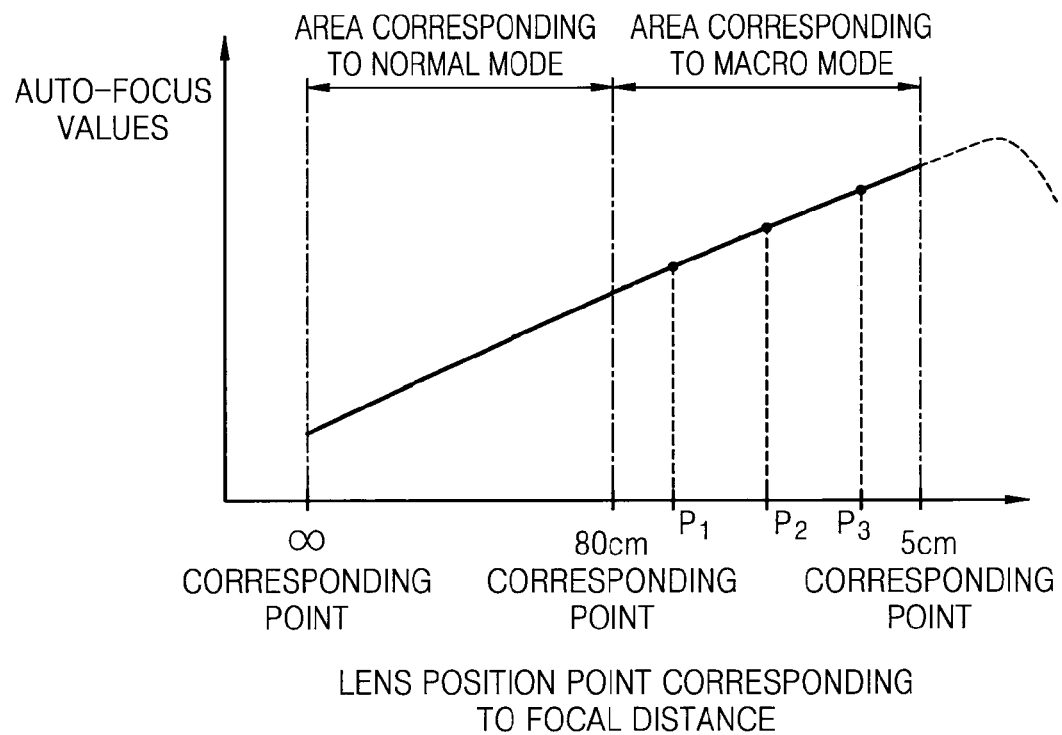
FIG. 6 is an example of a graph showing auto-focus values, which is used by a digital photographing apparatus to determine whether an auto-focusing lens position is within a lens position area corresponding to a macro mode according to an embodiment of the present invention.

FIG. 6 is an example of a graph showing auto-focus values, which is used by a digital photographing apparatus to determine whether an auto-focusing lens position is within a lens position range corresponding to a macro mode according to an embodiment of the present invention.

Referring to FIG. 6, in an embodiment, if a lens position point $P_3$ corresponding to a maximum value of auto-focus values obtained by an auto-focus value obtaining unit is farther from a lens position point corresponding to a normal mode than lens position points $P_1$ and $P_2$ corresponding to other auto-focus values, a lens position determining unit determines that the auto-focusing lens position should be within the lens position range corresponding to the macro mode and that a distance between the digital photographing apparatus and a subject needs to be increased. In an embodiment, the digital photographing apparatus of the present embodiment has a minimum focal distance of 5 cm (which may differ according to the characteristics of the digital photographing apparatus) and the distance between the digital photographing apparatus and the subject is shorter than the minimum focal distance of 5 cm. In an embodiment, when the user does not recognize that the distance between the digital photographing apparatus and the subject is shorter than the minimum focal distance, the digital photographing apparatus of the present embodiment instructs the user to increase the distance between the digital photographing apparatus and the subject by displaying a message on a display unit or by outputting sound, thereby reducing power consumption and increasing user convenience.

Figure 7:
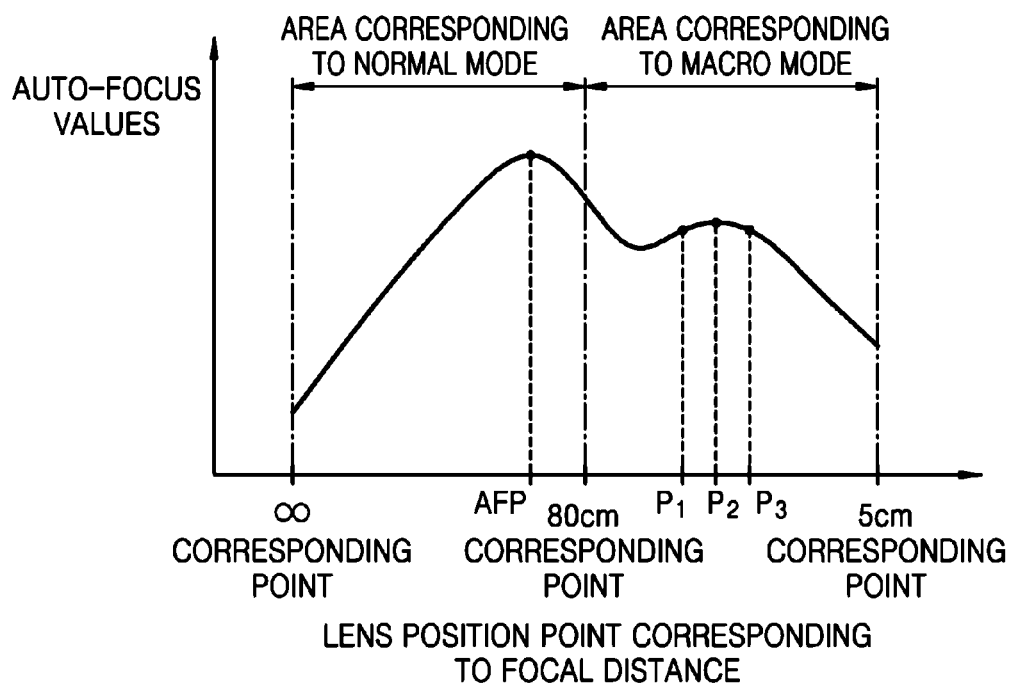
FIG. 7 is an example of a graph showing auto-focus values, which are used by a digital photographing apparatus to determine whether an auto-focusing lens position is within a lens position range corresponding to a macro mode according to an embodiment of the present invention.

FIG. 7 is an example of a graph showing auto-focus values, which, in an embodiment, are used by a digital photographing apparatus to determine whether an auto-focusing lens position should be within a lens position area corresponding to a macro mode according to another embodiment of the present invention.

Referring to FIG. 7, in an embodiment, if a lens position point $P_2$ corresponding to a maximum value of auto-focus values obtained by an auto-focus value obtaining unit within the lens position area corresponding to the macro mode is disposed between lens position points $P_1$ and $P_3$ corresponding to other auto-focus values, a lens position determining unit does not determine that the auto-focusing lens position should be determined in the lens position area corresponding to the macro mode but an auto-focusing lens position AFP should be determined in a lens position range corresponding to a normal mode. The graph shows an example of the relationship of the auto-focus values obtained at the three lens position points $P_1$, $P_2$, and $P_3$ due to shaking of the digital photographing apparatus of the present embodiment.

In an embodiment, the lens position determining unit determines that the auto-focusing lens position should not be in the lens position area corresponding to the macro mode based on a ratio of a minimum auto-focus value to a maximum auto-focus value or a ratio of the maximum auto-focus value to the minimum auto-focus value. In an embodiment, if the lens position point $P_2$ corresponding to the maximum value of auto-focus values obtained by the auto-focus value obtaining unit is disposed between the lens position points $P_1$ and $P_3$ corresponding to the other auto-focus values, and the ratio of the minimum auto-focus value to the maximum auto-focus value is smaller than a first predetermined value or the ratio of the maximum auto-focus value to the minimum auto-focus value is greater than a second predetermined value, the lens position determining unit determines that the auto-focusing lens position should be within the lens position range corresponding to the macro mode. In an embodiment, if the ratio of the minimum auto-focus value to the maximum auto-focus value is greater than the first predetermined value or the ratio of the maximum auto-focus value to the minimum auto-focus value is smaller than the second predetermined value, the lens position determining unit does not determine that the auto-focusing lens position should be within the lens position range corresponding to the macro mode. In an embodiment, the digital photographing apparatus begins obtaining different auto-focus values at the three lens position points $P_1$, $P_2$, and $P_3$ within the lens position range corresponding to the macro mode.

Although the maximum auto-focus value and the minimum auto-focus value greatly differ from each other as shown in FIGS. 3 and 4, when an unintended erroneous result is obtained due to an external factor as shown in FIG. 7, the maximum auto-focus value and the minimum auto-focus value may slightly differ from each other. In this regard, a graph showing auto-focus values is greatly inclined before and after an auto-focusing lens position point. Therefore, in an embodiment, if the maximum auto-focus value and the minimum auto-focus value greatly differ from each other, i.e., the ratio of the minimum auto-focus value to the maximum auto-focus value is smaller than the first predetermined value or the ratio of the maximum auto-focus value to the minimum auto-focus value is greater than the second predetermined value, the lens position determining unit determines that the auto-focusing lens position should be within the lens position range corresponding to the macro mode. Referring to FIG. 7, if the ratio of the minimum auto-focus value to the maximum auto-focus value is greater than the first predetermined value or the ratio of the maximum auto-focus value to the minimum auto-focus value is smaller than the second predetermined value, in an embodiment, the lens position determining unit does not determine that the auto-focusing lens position should be within the lens position area corresponding to the macro mode. In an embodiment, the previously established value may be determined by an experiment.

Figure 8:
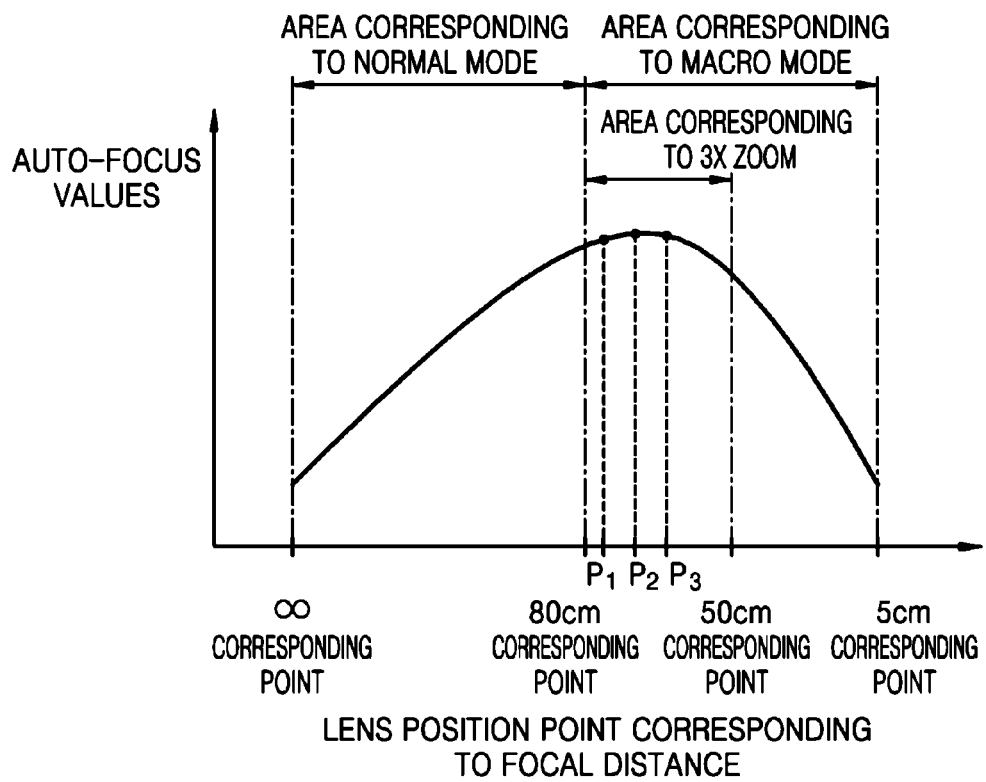
FIG. 8 is an example of a graph showing auto-focus values, which are used by a digital photographing apparatus to determine whether an auto-focusing lens position is within a lens position range corresponding to a selected zoom magnification in a lens position range corresponding to a macro mode according to an embodiment of the present invention.

FIG. 8 is an example of a graph showing auto-focus values, which is used by an embodiment of a digital photographing apparatus to determine whether an auto-focusing lens position should be within a lens position range corresponding to a selected zoom magnification in a lens position range corresponding to a macro mode according to an embodiment of the present invention. FIG. 9A is a graph showing a part of the graph shown in FIG. 8.

In an embodiment, the digital photographing apparatus has a zoom function. Many conventional digital photographing apparatuses having a zoom function obtain auto-focus values at all available lens position points, a range of position points including lens position points in a range corresponding to the macro mode, which differs according to the selected zoom magnification. For many digital photographing apparatuses, if the digital photographing apparatus has a 3× zoom function in which a minimum focal distance is 5 cm and a macro mode having a focal distance less than 80 cm, then the digital photographing apparatus may obtain auto-focus values in a range (i.e., a whole range corresponding to the macro mode) between a point corresponding to 80 cm and a point corresponding to 5 cm in a macro mode for 1× zoom, auto-focus values in an range between the point corresponding to 80 cm and a point corresponding to 10 cm in a macro mode for 2× zoom, and auto-focus values in a range between the point corresponding to 80 cm and a point corresponding to 50 cm in a macro mode for 3× zoom.

In an embodiment, an auto-focus value obtaining unit of the digital photographing apparatus of the present embodiment obtains auto-focus values at a plurality of lens position points within a lens position range corresponding to the selected zoom magnification in the lens position range corresponding to the macro mode. The plurality of lens position points are not all lens position points from which auto-focus values are obtained but are some of the lens position points in the lens position area corresponding to the selected zoom magnification in the lens position area corresponding to the macro mode. Many conventional digital photographing apparatuses obtain auto-focus values at all lens position points from which auto-focus values are obtained in the lens position area corresponding to the selected zoom magnification in the lens position range corresponding to the macro mode, unlike embodiments of the digital photographing apparatus of the present embodiment. Referring to FIG. 9A, in an embodiment auto-focus values are obtained at three lens position points $P_1$, $P_2$, and $P_3$ in the range between the point corresponding to 80 cm and the point corresponding to 50 cm in the macro mode of 3× zoom that is the lens position range corresponding to the selected zoom magnification in the lens position range corresponding to the macro mode.

In an embodiment, a lens position determining unit determines whether the auto-focusing lens position should be within the lens position range corresponding to the selected zoom magnification in the lens position range corresponding to the macro mode according to the position relationship between the lens position point $P_2$ corresponding to a maximum value of the auto-focus values obtained by the auto-focus value obtaining unit and the lens position points $P_1$ and $P_3$ corresponding to other auto-focus lens values.

In an embodiment, if the lens position determining unit determines that the auto-focusing lens position should be within the lens position range corresponding to the selected zoom magnification in the lens position range corresponding to the macro mode, the auto-focus value obtaining unit obtains the auto-focus values at each lens position point (within the area between the point corresponding to 80 cm and the point corresponding to 50 cm shown in FIG. 9A) within the lens position range corresponding to the selected zoom magnification in the lens position range corresponding to the macro mode, and determines the auto-focusing lens position.

In an embodiment, the auto-focus value obtaining unit obtains the auto-focus values at the plurality of lens position points within the lens position range corresponding to the selected zoom magnification in the lens position range corresponding to the macro mode in order to first determine whether a normal mode or the macro mode is appropriate to a current photographing status and thus obtaining the auto-focus values at the three lens position points of $P_1$, $P_2$, and $P_3$ shown in FIGS. 8 and 9A. In an embodiment, the digital photographing apparatus can determine whether the auto-focusing lens position should be in the lens position range corresponding to the selected zoom magnification in the lens position area corresponding to the macro mode, which may reduce the power required to change the lens position points. In an embodiment, the digital photographing apparatus does not obtain the auto-focus values at all lens position points within the lens position area corresponding to the selected zoom magnification in the lens position area corresponding to the macro mode, which may reduce power consumption. Hereinafter, it will be described that the auto-focus values are obtained at the three lens position points of $P_1$, $P_2$, and $P_3$ for convenience of description. However, in an embodiment, more auto-focus values for additional lens position points may be obtained.

In an embodiment, when the lens position point $P_2$ corresponding to the maximum value of the auto-focus values obtained by the auto-focus value obtaining unit is disposed between the lens position points $P_1$ and $P_3$ corresponding to other auto-focus values, the lens position determining unit determines that the auto-focusing lens position should be within the lens position range corresponding to the selected zoom magnification in the lens position range corresponding to the macro mode. Therefore, in an embodiment, the digital photographing apparatus obtains the auto-focus value within the lens position range corresponding to the selected zoom magnification in the lens position range corresponding to the macro mode, thereby determining the auto-focusing lens position and which may reduce power consumption accordingly and the time required to determine the auto focus lens position. Meanwhile, in an embodiment, when the lens position point $P_2$ corresponding to the maximum value of the auto-focus values obtained by the auto-focus value obtaining unit is not disposed between the lens position points $P_1$ and $P_3$ corresponding to other auto-focus values, the lens position determining unit determines that the auto-focusing lens position should be determined in a lens position area other than the lens position area corresponding to the selected zoom magnification in the lens position area corresponding to the macro mode or a lens position range corresponding to the normal mode.

FIG. 9B is an example of a graph showing auto-focus values, which are used by an embodiment of a digital photographing apparatus to determine whether an auto-focusing lens position should be within a lens position range corresponding to a selected zoom magnification in a lens position range corresponding to a macro mode according to another embodiment of the present invention.

In an embodiment, the digital photographing apparatus of the present embodiment has a 3× zoom function and a lens position range corresponding to a normal mode between an unlimited focal distance a first focal distance (e.g., 80 cm) and a lens position range corresponding to the macro mode, which is less than the first focal distance. In an embodiment, the lens position range corresponding to the macro mode includes an range (i.e., a whole area corresponding to the macro mode) corresponding to 1× zoom which is between a point corresponding to 80 cm and a point corresponding to 5 cm, an range corresponding to 2× zoom between the point corresponding to 80 cm and a point corresponding to 10 cm, and an range corresponding to 3× zoom between the point corresponding to 80 cm and a point corresponding to 50 cm.

In embodiment, the 3× zoom status, if a lens position point $P_1$ corresponding to a maximum value of the auto-focus values obtained by an auto-focus value obtaining unit is not disposed between lens position points $P_2$ and $P_3$ corresponding to other auto-focus values, that is, in more detail, if the lens position point $P_1$ corresponding to the maximum value of the auto-focus values obtained by the auto-focus value obtaining unit is closer to the lens position point corresponding to the normal mode than the lens position points $P_2$ and $P_3$ corresponding to the other auto-focus values, a lens position determining unit determines that the auto-focusing lens position should be within the lens position range corresponding to the normal mode. Therefore, in an embodiment, the digital photographing apparatus changes the lens position points within the area corresponding to the normal mode, rather than the range corresponding to the macro mode, and obtains the auto-focus value, thereby determining the auto-focusing lens position, which may reduce power consumption accordingly and which may reduce the time to determine the auto focus position.

Figure 9C:
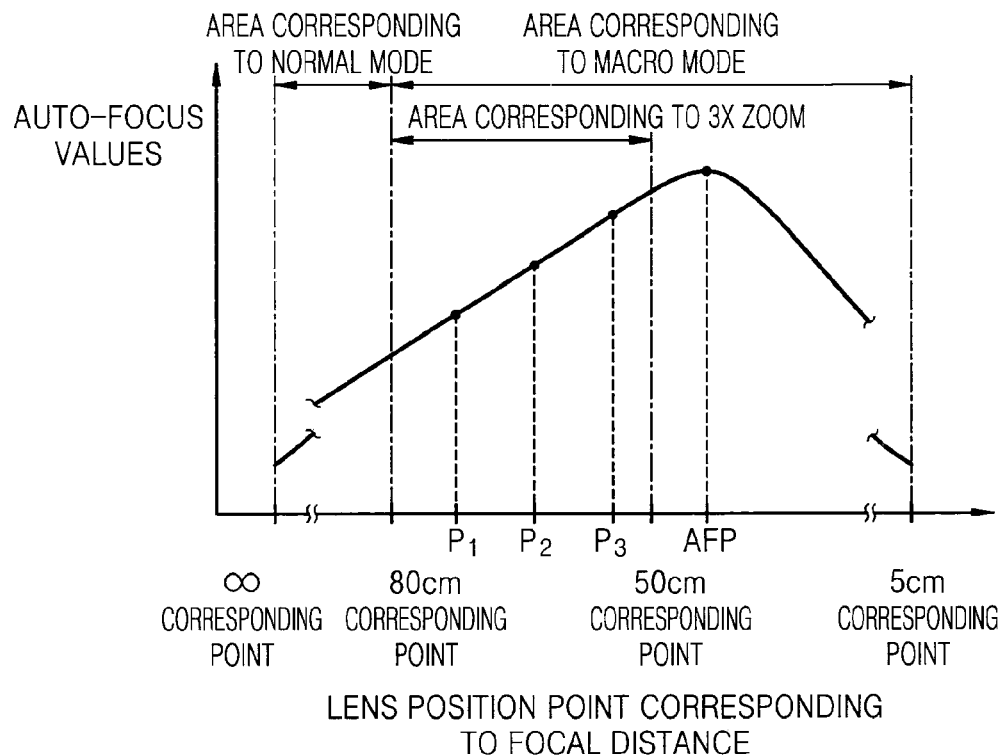
FIG. 9C is an example of a graph showing auto-focus values, which are used by a digital photographing apparatus to determine whether an auto-focusing lens position is within a lens position range corresponding to a selected zoom magnification in a lens position range corresponding to a macro mode according to an embodiment of the present invention.

FIG. 9C is an example of a graph showing auto-focus values, which in an embodiment, is used by a digital photographing apparatus to determine whether an auto-focusing lens position should be within a lens position range corresponding to a selected zoom magnification in a lens position range corresponding to a macro mode according to another embodiment of the present invention.

Referring to FIG. 9C, in an embodiment, if a lens position point $P_3$ corresponding to a maximum value of auto-focus values obtained by an auto-focus value obtaining unit is farther from a lens position point corresponding to a normal mode than lens position points $P_1$ and $P_2$ corresponding to other auto-focus values, a lens position determining unit determines that the auto-focusing lens position is within the lens position area corresponding to the macro mode and that the selected zoom magnification should be reduced or a distance between the digital photographing apparatus and a subject should be increased.

In an embodiment, the digital photographing apparatus of the present embodiment selects the auto-focusing lens position in a lens position range corresponding to a selected 3× zoom. The graph shows that, in an embodiment, the digital photographing apparatus can perform auto-focusing at a zoom magnification (i.e., in a wider angle or zooming-out status) lower than the 3× zoom or by increasing the distance between the digital photographing apparatus and the subject.

However, a user who does not recognize such status may repeatedly manipulate the digital photographing apparatus to perform auto-focusing, which consumes power while auto-focusing is not performed. Therefore, in an embodiment, the digital photographing apparatus of the present embodiment instructs the user to increase the distance between the digital photographing apparatus and the subject or to reduce the zoom magnification by displaying a message on a display unit or by outputting sound, which may reduce power consumption and increase user convenience. In an embodiment, the user is notified about the reduction of the zoom magnification when the selected zoom magnification is not a minimum zoom magnification. In an embodiment, if the selected zoom magnification is the minimum zoom magnification, the digital photographing apparatus instructs the user to increase the distance between the digital photographing apparatus and the subject by displaying a message on the display unit or by outputting sound.

In an embodiment, if a lens position point $P_2$ corresponding to the maximum value of auto-focus values obtained by an auto-focus value obtaining unit is disposed between lens position points $P_1$ and $P_3$ corresponding to other auto-focus values, the digital photographing apparatus may determine whether a ratio of a minimum auto-focus value to a maximum auto-focus value is smaller than a first predetermined value or a ratio of the maximum auto-focus value to the minimum auto-focus value is greater than a second predetermined value, which is similar to the description given with reference to FIG. 7 and thus a detailed description thereof will not be repeated here.

Figure 10:
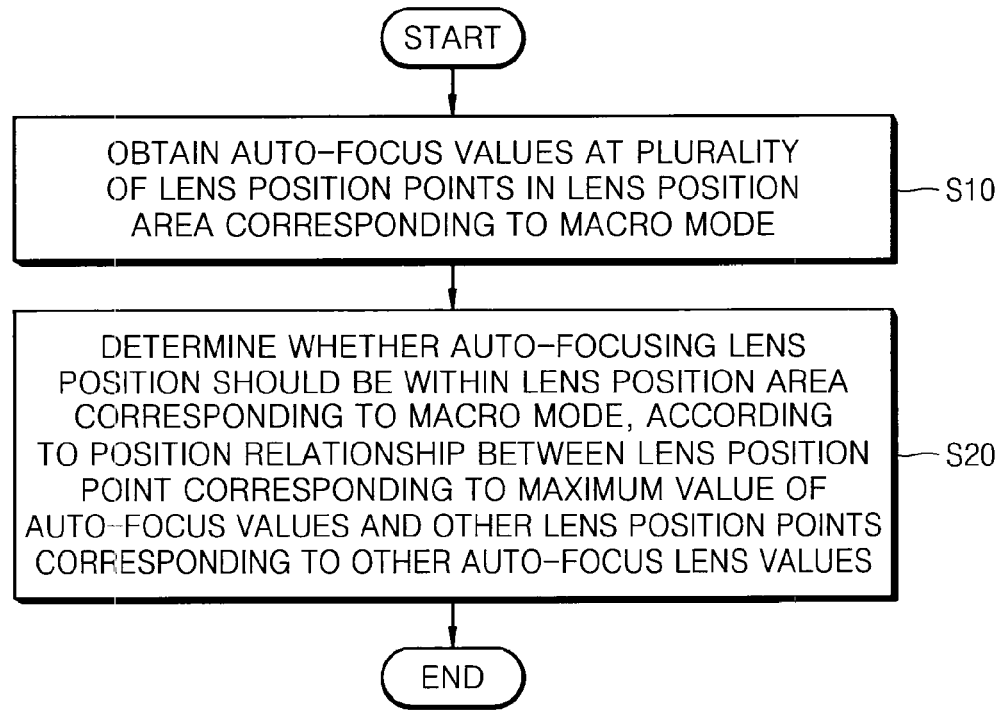
FIG. 10 is an example of a schematic flowchart of a method of controlling a digital photographing apparatus, according to an embodiment of the present invention.

FIG. 10 is an example of a schematic flowchart of a method of controlling a digital photographing apparatus, according to another embodiment of the present invention.

Referring to FIG. 10, in an embodiment, the method of controlling the digital photographing apparatus of the present embodiment comprises obtaining auto-focus values at a plurality of lens position points in a lens position range corresponding to a macro mode (operation S10), and determining whether an auto-focusing lens position is within the lens position range corresponding to the macro mode according to the position relationship between a lens position point corresponding to a maximum value of the auto-focus values and other lens position points corresponding to other auto-focus lens values (operation S20). In an embodiment, of operation S10, the auto-focus values are obtained at three lens position points, which may reduce power consumption.

In an embodiment, of operation S20, if a lens position point corresponding to a maximum value of the auto-focus values is disposed between lens position points corresponding to other auto-focus values, it may be determined that the auto-focusing lens position should be within the lens position range corresponding to the selected zoom magnification in the lens position range corresponding to the macro mode.

Also, in an embodiment of operation S20, in order to prevent the occurrence of an error due to shaking of the digital photographing apparatus, if the lens position point corresponding to the maximum value of the auto-focus values is disposed between the lens position points corresponding to the other auto-focus values, and a ratio of a minimum auto-focus value to a maximum auto-focus value is smaller than a first predetermined value or a ratio of the maximum auto-focus value to the minimum auto-focus value is greater than a second predetermined value, it may be determined that the auto-focusing lens position should be within the lens position range corresponding to the macro mode. Therefore, it is possible to precisely determine whether the digital photographing apparatus performs auto-focusing in a range other than the lens position range corresponding to the macro mode due to shaking of the digital photographing apparatus.

In an embodiment, when the digital photographing apparatus of the present embodiment has a lens position range corresponding to a normal mode between an unlimited focal distance and a first focal distance and a lens position range corresponding to the macro mode, which is less than the first focal distance, if the lens position point corresponding to the maximum value of the auto-focus values is not disposed between the lens position points corresponding to the other auto-focus values, it may be determined that the auto-focusing lens position should be within a lens position range other than the lens position area corresponding to the macro mode. In an embodiment, if the lens position point corresponding to the maximum value of the auto-focus values is closer to the lens position point corresponding to the normal mode than the lens position points corresponding to the other auto-focus values, it may be determined that the auto-focusing lens position should be within the lens position range corresponding to the normal mode.

In an embodiment, the method of the present embodiment may be applied to a digital photographing apparatus having a zoom function. In an embodiment of operation S10, the auto-focus values are obtained at a plurality of lens position points within a lens position range corresponding to a selected zoom magnification in the lens position range corresponding to the macro mode. In an embodiment of operation S10, to reduce power consumption, the auto-focus values may be obtained at three lens position points. In an embodiment of operation S20, it is determined whether the auto-focusing lens position should be within the lens position range corresponding to the selected zoom magnification in the lens position range corresponding to the macro mode according to the position relationship between the lens position point corresponding to the maximum value of the auto-focus values and the other lens position points corresponding to the other auto-focus lens values.

In an embodiment of operation S20, if the lens position point corresponding to the maximum value of the auto-focus values is disposed between the lens position points corresponding to the other auto-focus values, it may be determined that the auto-focusing lens position should be within the lens position range corresponding to the selected zoom magnification in the lens position range corresponding to the macro mode.

In an embodiment of operation 20, in order to prevent the occurrence of an error due to shaking of the digital photographing apparatus, if the lens position point corresponding to the maximum value of the auto-focus values is disposed between the lens position points corresponding to the other auto-focus values, and the ratio of the minimum auto-focus value to the maximum auto-focus value is smaller than a first predetermined value or a ratio of the maximum auto-focus value to the minimum auto-focus value is greater than a second predetermined value, it may be determined that the auto-focusing lens position should be within the lens position range corresponding to the selected zoom magnification in the lens position range corresponding to the macro mode. In an embodiment, it is possible to determine whether the digital photographing apparatus performs auto-focusing in an range other than the lens position area corresponding to the macro mode due to shaking of the digital photographing apparatus.

In an embodiment, the digital photographing apparatus of the present embodiment has a lens position range corresponding to a normal mode between an unlimited focal distance and a first focal distance and a lens position range corresponding to the macro mode, which is less than the first focal distance, if the lens position point corresponding to the maximum value of the auto-focus values is not disposed between the lens position points corresponding to the other auto-focus values, it may be determined that the auto-focusing lens position should be within a lens position range other than the lens position area corresponding to the selected zoom magnification in the lens position range corresponding to the macro mode or the lens position range corresponding to the normal mode. In this case, in operation S20, if the lens position point corresponding to the maximum value of the auto-focus values is closer to the lens position point corresponding to the normal mode than the lens position points corresponding to the other auto-focus values, it may be determined that the auto-focusing lens position should be within the lens position area corresponding to the normal mode. Also, in operation S20, if the lens position point corresponding to the maximum value of the auto-focus values is the farthest from the lens position point corresponding to the normal mode compared to the lens position points corresponding to the other auto-focus values, and the selected zoom magnification is not a minimum zoom magnification, it may be determined that the auto-focusing lens position should be within the lens position range corresponding to the normal mode, and the selected zoom magnification is reduced.

In an embodiment, instructions for executing the methods of controlling a digital photographing apparatus, according to the above embodiments of the present invention can be stored on a computer readable recording medium. In an embodiment, the computer readable recording medium may be the memory 60 or the storage medium 70 which are illustrated in FIG. 2. In an embodiment, other storage medium may be used. Examples of the recording medium include magnetic storage media (e.g., ROM, floppy disks, hard disks, etc.) and optical recording media (e.g., CD-ROMs, or DVDs).

As described above, according to the present invention, a digital photographing apparatus capable of automatically determining whether a macro mode is an appropriate mode, a method of controlling the same, and computer readable recording medium storing instructions that when executed by a processor perform the method(s).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
a lens unit, a position of which is changed to perform auto-focusing;
an imaging device, obtaining data regarding an image obtained from light input via the lens unit;
an auto-focus value obtaining unit obtaining an auto-focus value from the data obtained by the imaging device; and
a lens position determining unit for auto-focusing,
wherein the auto-focus value obtaining unit obtains a plurality of auto-focus values at a plurality of lens position points within a lens position range corresponding to a macro mode,
the lens position determining unit determines whether an auto-focusing lens position is within the lens position range corresponding to the macro mode, according to the position relationship between a lens position point corresponding to a maximum value of the plurality of auto-focus values obtained by the auto-focus value obtaining unit and other lens position points corresponding to other auto-focus lens values, and the lens position determining unit determines that the auto-focusing lens position is within the lens position range corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a second predetermined value.

2. The digital photographing apparatus of claim 1, wherein the auto-focus value obtaining unit obtains the auto-focus values at three lens position points.

3. The digital photographing apparatus of claim 1, wherein the digital photographing apparatus has a lens position range corresponding to a normal mode between an infinite focal distance and a first focal distance and a lens position range corresponding to the macro mode, which is less than the first focal distance, and
the lens position determining unit, if the lens position point corresponding to the maximum value of the plurality of auto-focus values obtained by the auto-focus value obtaining unit is not disposed between the lens position points corresponding to the other auto-focus values, determines that the auto-focusing lens position is within a lens position range other than the lens position range corresponding to the macro mode.

4. The digital photographing apparatus of claim 1, wherein the digital photographing apparatus has a lens position range corresponding to a normal mode between an unlimited focal distance and a first focal distance and the lens position range corresponding to the macro mode, which is less than the first focal distance, and
the lens position determining unit, if the lens position point corresponding to the maximum value of the plurality of auto-focus values obtained by the auto-focus value obtaining unit is closer to the lens position point corresponding to the normal mode than the lens position points corresponding to the other auto-focus values, determines that the auto-focusing lens position should be within the lens position range corresponding to the normal mode.

5. A digital photographing apparatus having a zoom function comprising:
a lens unit, a position of which is changed to perform auto-focusing;
an imaging device obtaining data regarding an image from light input via the lens unit;
an auto-focus value obtaining unit obtaining an auto-focus value from the data obtained by the imaging device; and
a lens position determining unit for auto-focusing,
wherein the auto-focus value obtaining unit obtains a plurality of auto-focus values at a plurality of lens position points within a lens position range corresponding to a selected zoom magnification in a lens position range corresponding to a macro mode,
the lens position determining unit determines whether an auto-focusing lens position is within the lens position range corresponding to the selected zoom magnification in the lens position range corresponding to the macro mode, according to the position relationship between a lens position point corresponding to a maximum value of the plurality of auto-focus values obtained by the auto-focus value obtaining unit and other lens position points corresponding to other auto-focus lens values, and the lens position determining unit determines that the auto-focusing lens position is within the lens position range corresponding to the selected zoom magnification in the lens position range corresponding to the macro mode if the lens position point corresponding to the maximum value of the plurality of auto-focus values obtained by the auto-focus value obtaining unit is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a second predetermined value.

6. The digital photographing apparatus of claim 5, wherein the auto-focus value obtaining unit obtains the auto-focus values at three lens position points.

7. The digital photographing apparatus of claim 5, wherein the digital photographing apparatus has a lens position range corresponding to a normal mode between an unlimited focal distance and a first focal distance and a lens position range corresponding to the macro mode, which is less than the first focal distance, and the lens position determining unit, if the lens position point corresponding to the maximum value of the plurality of auto-focus values obtained by the auto-focus value obtaining unit is not disposed between the lens position points corresponding to the other auto-focus values, determines that the auto-focusing lens position is determined in a lens position range other than the lens position range corresponding to the selected zoom magnification in the lens position range corresponding to the macro mode or a lens position range corresponding to the normal mode.

8. The digital photographing apparatus of claim 5, wherein the digital photographing apparatus has the lens position range corresponding to a normal mode between an infinite focal distance and a first focal distance and the lens position range corresponding to the macro mode, which is less than the first focal distance, and the lens position determining unit, if the lens position point corresponding to the maximum value of the plurality of auto-focus values obtained by the auto-focus value obtaining unit is closer to the lens position point corresponding to the normal mode than the lens position points corresponding to the other auto-focus values, determines that the auto-focusing lens position should be within the lens position range corresponding to the normal mode.

9. The digital photographing apparatus of claim 5, wherein the digital photographing apparatus has a lens position range corresponding to a normal mode between an infinite focal distance and a first focal distance and the lens position range corresponding to the macro mode, which is less than the first focal distance, and the lens position determining unit, if the lens position point corresponding to the maximum value of the plurality of auto-focus values obtained by the auto-focus value obtaining unit is the farthest from the lens position point corresponding to the normal mode compared to the lens position points corresponding to the other auto-focus values, and the selected zoom magnification is not a minimum zoom magnification, determines that the auto-focusing lens position should be within the lens position range corresponding to the macro mode, and the selected zoom magnification should be reduced.

10. A method of controlling a digital photographing apparatus, the method comprising:

obtaining a plurality of auto-focus values at a plurality of lens position points within a lens position range corresponding to a macro mode; and determining whether an auto-focusing lens position should be within the lens position range corresponding to the macro mode, according to the position relationship between a lens position point corresponding to a maximum value of the plurality of auto-focus values and other lens position points corresponding to other auto-focus lens values, wherein the determining comprises determining that the auto-focusing lens position should be within the lens position range corresponding to the macro mode if the lens position point corresponding to the maximum value of the plurality of auto-focus values is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a second predetermined value.

11. The method of claim 10, wherein the obtaining comprises: obtaining the auto-focus values at three lens position points.

12. A non-transitory computer readable recording medium storing computer instructions for executing the method of claim 10.

13. A method of controlling a digital photographing apparatus, the method comprising:

obtaining a plurality of auto-focus values at a plurality of lens position points within a lens position range corresponding to a selected zoom magnification in a lens position range corresponding to a macro mode; and determining whether an auto-focusing lens position is within the lens position range corresponding to the selected zoom magnification in the lens position range corresponding to the macro mode, according to the position relationship between a lens position point corresponding to a maximum value of the plurality of auto-focus values and other lens position points corresponding to other auto-focus lens values, wherein the determining comprises determining that the auto-focusing lens position should be within the lens position range corresponding to the selected zoom magnification in the lens position range corresponding to the macro mode if the lens position point corresponding to the maximum value of the plurality of auto-focus values is disposed between the other lens position points corresponding to the other auto-focus lens values, and a ratio of a minimum auto-focus value to a maximum auto-focus value is smaller than a predetermined value or a ratio of the maximum auto-focus value to the minimum auto-focus value is greater than a second predetermined value.

14. The method of claim 13, wherein the obtaining comprises: obtaining the auto-focus values at three lens position points.

15. A non-transitory computer readable recording medium storing instructions for executing the method of claim 13.

* * * * *